United States Patent

Hooker

[15] 3,704,511
[45] Dec. 5, 1972

[54] FLY'S EYE LENS PROCESS
[72] Inventor: John M. Hooker, Owensboro, Ky.
[73] Assignee: General Electric Company
[22] Filed: Dec. 18, 1969
[21] Appl. No.: 886,218

[52] U.S. Cl. ..............29/592, 29/25.16, 29/25.17, 29/25.14, 29/447, 29/622, 29/471.1, 313/348
[51] Int. Cl....................B23k 21/00, B23p 11/02
[58] Field of Search..........29/592, 622, 25.16, 471.1, 29/472.3, 472.7, 25.17, 447; 313/348, 262, 268, 299

[56] References Cited

UNITED STATES PATENTS

| | | | |
|---|---|---|---|
| 2,654,940 | 10/1953 | Law | 29/447 X |
| 3,284,655 | 11/1966 | Oess | 313/348 X |
| 3,435,274 | 3/1969 | Miller | 313/348 |
| 3,436,585 | 4/1969 | Murakami | 313/348 |
| 2,463,416 | 3/1949 | Nordsieck | 29/25.16 |
| 2,508,979 | 5/1950 | Van Gessel | 29/25.16 |
| 2,740,913 | 4/1956 | Majkrzak | 29/25.16 |
| 3,336,664 | 8/1967 | Hankins | 29/622 |

Primary Examiner—John F. Campbell
Assistant Examiner—Robert W. Church
Attorney—Nathan J. Cornfeld, John P. Taylor, Frank L. Neuhauser, Oscar B. Waddell and Joseph B. Forman

[57] ABSTRACT

An improved structure and method for the electrostatic lens array of a fly's eye lens in an electron beam device resulting in precise parallel spacing of the planar lens electrodes as well as precise axial alignment of the arrays of openings in the lens electrodes.

9 Claims, 3 Drawing Figures

ATTACH PLANAR MEMBERS TO SUPPORT RINGS AT NON-AMBIENT TEMPERATURE.

BRING SUBASSEMBLIES TO AMBIENT TEMPERATURE TO TENSION PLANAR MEMBERS.

AXIALLY ALIGN OPENINGS IN ADJACENT PLANAR MEMBERS.

ATTACH ADJACENT SUPPORT RINGS WHILE MAINTAINING AXIAL ALIGNMENT.

INVENTOR:
JOHN M. HOOKER,
BY John P. Taylor
HIS ATTORNEY.

FLY'S EYE LENS PROCESS

BACKGROUND OF THE INVENTION

This invention relates to an electron beam tube having a compound lens system comprising a plurality of focusing and deflecting electrodes in a matrix for precise control of the electron beam. More particularly it relates to a novel electrostatic focusing lens array structure for the tube and to a method of constructing the lens structure.

A system for precise control of an electron beam is described in a paper by S.P. Newberry titled *Problems of Microspace Information Storage*, appearing in the Fourth Electron Beam Symposium (March 29-30, 1962), published by Alloyd Electronics Corporation, Boston, Massachusetts, and again in *The Fly's Eye Lens—A Novel Electron Optical Component for Use With Large Capacity Random Access Memories* by S.P. Newberry in Volume 29 of the *American Federation of Information Processing Societies, Conference Proceedings*, published by Spartan Books, Washington, D.C. (November 1966). The system therein described comprises an ultrahigh density memory wherein impingement of an electron beam on a storage medium is controlled by an objective lens made up of a matrix of minute electron optical lenses, therein referred to as lenslets. This matrix of lenses is superficially similar in appearance to the compound eye of an ordinary housefly and therefor is designated a Fly's Eye Lens. By utilizing coarse deflection of the electron beam so as to strike only a desired lens of the matrix, the lens, thus struck, positions the beam to ultimately impinge upon the storage medium at the desired point. Although the coarsely deflected beam may not strike the desired lens at dead center, the accuracy with which the beam strikes the storage medium remains unimpaired so long as even a portion of the beam strikes the desired lens.

Briefly, the planar array of lenses comprises three parallel plates with a plurality of axially aligned openings therein to form an array of electrostatic lenses for fine focusing and, immediately following each lens, a set of X and Y deflection plates for fine deflection. The resultant ultra high resolution electron beam tube can be used, for example, in apparatus for the fabrication of integrated circuits such as described and claimed in copending application Ser. No. 671,353, filed Sept. 28, 1967, now U.S. Pat. No. 3,491,236, and assigned to the assignee of this invention.

It has been found that the mounting of the three parallel plates comprising the electrostatic focusing lenses in exact parallel relationship as well as correct axial alignment with regard to the respective openings in the plates is difficult. The plates tend to sag slightly thus disturbing the electron optics of the lenses including the uniformity of the foci of the respective lenses.

It is therefor an object of this invention to provide an improved electrostatic lens structure for a compound lens system with precise parallel spacing of the planar metallic members comprising the electrodes of the lenses as well as precise axial alignment of the respective openings in the planar members through which the beam passes.

It is another object of this invention to provide a method of assembling an improved electrostatic lens structure for a compound lens system.

These and other objects will be apparent from the drawings and the description.

In accordance with a preferred embodiment of the invention, the lens structure comprises an assembly of parallel, spaced planar metallic members. Each of the members is attached to a metallic support ring having a coefficient of expansion different from that of the planar member. The attachment of each planar member to a support ring is made at a preselected temperature so that subsequent exposure to a second selected temperature, such as, for example, the normal operating temperature of the lens structure, causes a tensioning of the planar member. The openings in each planar member are axially aligned with the respective openings of the other planar members comprising the lens. Alignment is maintained by the peripheral attachment of the respective support members together. The invention will be further understood by referring to the following description and drawings.

DESCRIPTION OF THE PREFERRED EMBODIMENTS

Figures 1, 2, 3:
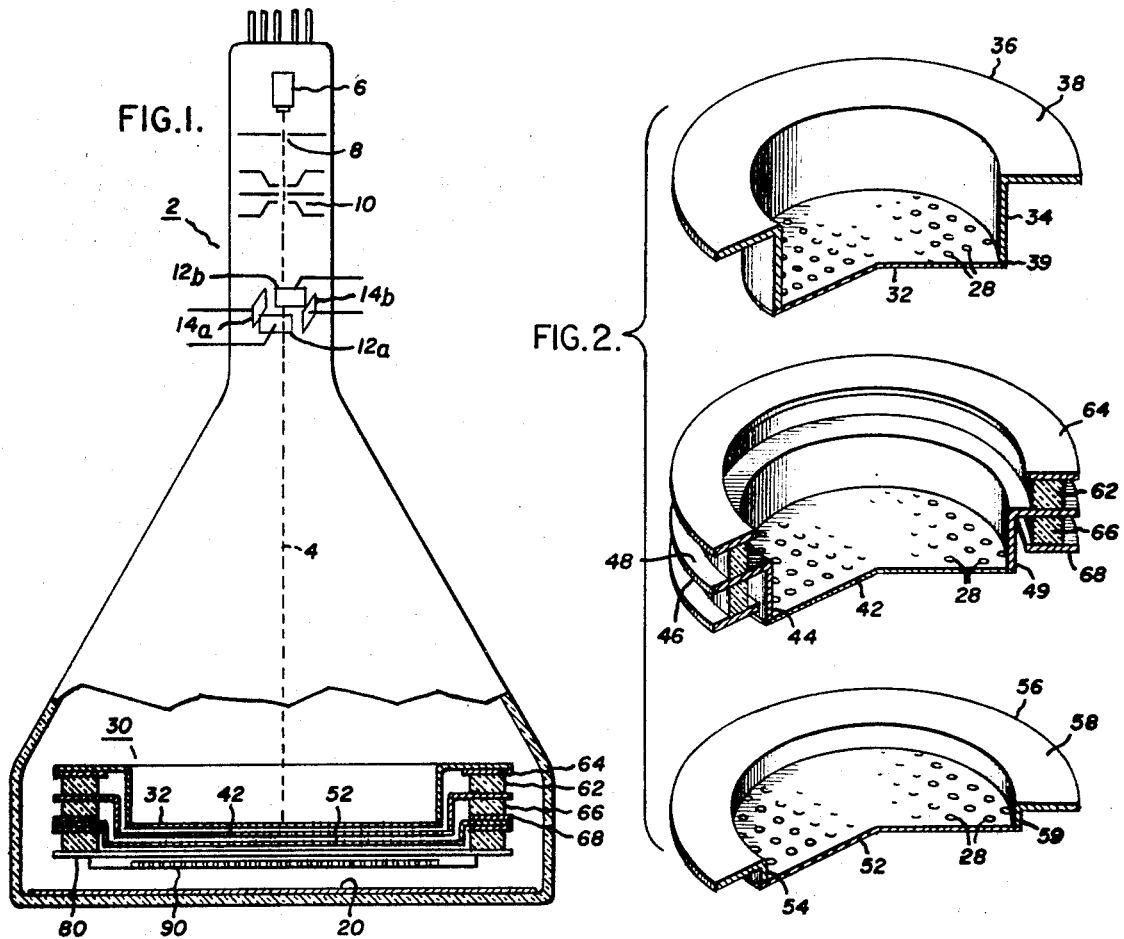
FIG. 1 is a longitudinal cross-sectional sketch illustrating a device using the lens structure of the invention.
FIG. 2 is an exploded isometric view of the lens structure.
FIG. 3 is a flow sheet of the method for constructing the lens structure.

FIG. 1 generally illustrates a device in which the lens system of the invention may be used. A vacuum enclosure is generally indicated at 2 wherein a beam 4 of charged particles such as an electron beam produced by an electron emitting source 6 is controllably deflected onto a target 20 such as a semiconductor wafer coated with an electron-sensitive resist material.

Beam 4 produced by electron source 6 passes through a beam limiting aperture 8 and is collimated by an electrostatic condenser lens 10. The beam is then coarsely deflected in the X and Y planes respectively, by deflection plates 12a, 12b and 14a, 14b. The particular electron optics used to direct the beam to each lens may, of course, be varied and optimized using various structures and techniques forming no part of the present invention.

The lens structure of the invention is generally indicated at 30 in FIG. 1. The lens structure, which will be described in more detail below, generally comprises three parallel plates 32, 42, and 52, each having an array of openings 28 therethrough in axial alignment to form an array of electrostatic lenses.

Immediately following the lens structure is a fine deflection system comprising a first set of parallel bars 80 immediately followed by a second set of parallel bars 90 at right angles to the first set of bars. The bars thus form a criss-cross array or lattice conforming spacially to the openings in the lens plates to provide a fine X-Y deflection system for each lens. The fine deflection system is more fully described in said aforementioned U.S. patent application Ser. No. 671,353—Newberry, filed Sept. 28, 1967, cross-reference to which is hereby made.

Referring now to FIG. 2, the construction of the electrostatic lens 30 of the invention is more clearly illustrated. It should be noted that the openings 28 in the lens plate have been exaggerated in size for illustrative purposes. In actual construction, openings 28 may be so small they would be difficult to see with the naked eye. A circular lens plate 32 is mounted on a cylindrical portion 34 of a metallic support ring 36 having a generally horizontal outer support lip 38.

A second circular lens plate 42, of slightly larger diameter than lens plate 32, is mounted on cylindrical portion 44 of a metallic support ring 46. Cylindrical portion 44 is of slightly larger diameter than cylindrical portion 34 of support ring 36. Support ring 46 has a generally horizontal outer support lip 48. The cylindrical portion 44 is somewhat shorter in length than cylindrical portion 34 of support ring 36.

Circular lens plate 52, of slightly larger diameter than lens plate 42, is mounted on cylindrical portion 54 of support ring 56. Cylindrical portion 54 is of larger diameter and shorter length than corresponding cylindrical portion 44. Thus, as is apparent from the drawing, the three lens plates and corresponding support rings are dimensioned to fit together in nesting relationship.

Since lens plates 32, 42, and 52 each forms one electrode of a three electrode electrostatic lens, the lens plates must be insulated from one another. Ceramic insulating cylinders 62 and 66 are therefore provided. Ceramic cylinders 62 and 66 are respectively sealed to the upper and lower surfaces of horizontal lip 48 of support ring 46. The opposite end of each ceramic cylinder is fitted with respective flanges 64 and 68 for subsequent attachment to support rings 36 and 56 as will be described.

In accordance with the preferred embodiment of the invention, the materials chosen for the lens plates 32, 42, and 52, the support rings 36, 46, and 56; flanges 64 and 68, and the ceramic insulators 62 and 66 are selected to provide (a) a good ceramic to metal bond between the metallic support ring material and ceramic insulators as well as flanges 64 and 68 with the ceramic insulator; (b) a coefficient of expansion mismatch between the metallic lens plates and the support ring; and (c) a matching coefficient of expansion between the support rings and flanges 64 and 68.

Thus as a specific example of materials selected in the preferred embodiment of the invention, support rings 36, 46, and 56 and flanges 64 and 68 are made of titanium metal and insulating rings 62 and 66 are made of fosterite ceramic. Excellent ceramic-to-metal bonds can be obtained with these materials following the method described and claimed in Beggs U.S. Pat. No. 2,857,663, issued Oct. 28, 1958 and assigned to the assignee of this invention.

When the above materials are used, lens plates 32, 42, and 52 are preferably made from molybdenum or stainless steel. Each of these materials is thermally mismatched with respect to the titanium support rings for a specific purpose as will be hereinafter described. Furthermore, both of these lens plate material have machining and chemical etching characteristics which are satisfactory for the placement of an accurately spaced array of openings therein with controlled dimensions.

As previously mentioned, each of the lens plates 32, 42, and 52, are provided with an array of openings therethrough. The axis of the openings in each lens plate are spaced apart in prearranged identical fashion allowing the respective openings in the three lens plates to be axially aligned upon subsequent assembly. Thus the parallel mounting of the lens plates, with their respective openings aligned, creates an array of Einzel lenses. For the electron optics of these lenses to be correct and repetitive requires specific and accurate spacing of the lens plates relative to one another as well as precise parallel relationship. Little or no warpage or sagging of the plates can be tolerated.

For this reason the metal material used for the lens plates is deliberately chosen to be thermally mismatched to the support ring so that attachment at a temperature other than normal operating temperature followed by a return to normal operating temperature will cause a tensioning of the lens plate on its respective support ring.

Furthermore, to ensure the parallel relationship, the support rings 36, 46, and 56 preferably are pre-assembled before attachment of the lens plates and the respective end surfaces 39, 49, and 59 of the cylindrical portions of the support rings are machined to exact parallel relationship. This may be done, for example, by pre-attaching ceramic insulators 62 and 66 having flanges 64 and 68 respectively attached thereto to the upper and lower surfaces of horizontal portion 48 of support ring 46. Upper support ring 36 and lower support ring 56 may then be detachably affixed to support ring 46 via an appropriate releasable bonding agent between horizontal portion 38 and flange 64, and horizontal portion 58 and flange 68. After the machining of cylinder ends 39, 49, and 59, the three support rings are disassembled preparatory to attachment of the lens plates to the support rings.

Following disassembly, each lens plate is suitably attached securely to its support ring such as by welding or the like. When, for example, molybdenum lens plates are used, the lens plate and the titanium support ring are placed in a low temperature environment such as, for example, a liquid nitrogen or acetone-dry ice bath and welded together while at a depressed temperature. Subsequent removal of the welded lens plate-support ring assembly from the low temperature environment results in a greater expansion of the titanium support ring because of the thermal mismatch of the materials thereby tensioning the molybdenum plate. The attachment process is repeated for each lens plate support ring assembly.

Alternatively, when stainless steel is selected as the material for the lens plate, the weld is made at an elevated temperature. In this case, the greater expansion of the stainless steel causes a tensioning of the lens plate upon subsequent cooling to normal operating temperature.

The term "normal operating temperature" is herein defined as the temperature of the electrostatic lens structure itself in actual operation in an electron beam tube which may vary from about 0°C to about 300°C depending upon whether heating or cooling means are employed in the vicinity of the lens structure.

The term "elevated temperature," therefore, is intended to define a temperature above normal operating temperature. It should be noted, however, that the elevated temperature need not be higher than 300°C if the contemplated normal operating temperature is not to be that high. The contemplated normal operating temperature may vary with the materials selected for the thermal mismatch. For example, a stainless steel lens plate is normally welded to a titanium support ring at 150°C. Therefore, when the lens structure is to be operated at about room temperature, or at least below 150°C, such materials can be used. If, however, higher operating temperatures are contemplated other material combinations must be used; for example, the molybdenum lens plate—titanium support ring previously described.

The term "low temperature" is intended to define a temperature below normal operating temperature, i.e., a temperature below about 0°C.

Following individual attachment of the respective lens plates to their support rings, the electrostatic lens is assembled by placing the lens plate-support ring subassemblies on independently adjustable stages under a high power microscope to axially align the respective openings in the lens plates. For convenience, it is preferred to align and attach two lens plate-support ring assemblies in a first step followed by alignment and attachment of the third lens plate-support ring assembly.

In accordance with the invention, the lens plate openings are axially aligned and, while maintaining alignment, the respective support rings are rigidly secured about their peripheries. Thus the openings in lens plate 32 are axially aligned with the respective openings in lens plate 42 and, while alignment is maintained, support ring 36 is secured to support ring 46 by welding or clamping horizontal lip 38 on support ring 36 to flange 64 carried by ceramic insulator 62 attached to horizontal lip 48 of support ring 46. By constructing both flange 64 and support ring 36 of the same metal, a weld can be made without danger of disturbing the precise axial alignment of the openings in the lens plate by localized heating and uneven expansion of the metals (if dissimilar metals were used) at the weld junction.

Following alignment and attachment of lens plates 32 and 42, the openings in lens plate 52 are similarly aligned to the partially assembled lens and attachment is made, via lip 58 on support ring 56 to flange 68 while maintaining the axial alignment.

It should be noted here that ceramic spacers 62 and 66 may alternatively be mounted or sealed respectively to horizontal lips 38 and 58 of support rings 36 and 56. In this embodiment flanges 64 and 68 would be attached to the opposite side of the respective spacers for subsequent attachment respectively to the upper and lower surfaces of lip 48.

Thus, precise axial alignment of the respective openings in all three lens plates is maintained by attachment of the lens plates to one another by materials of matching temperature coefficient of expansion. Precise parallel spacing of the lens plates is achieved by attachment of each lens plate at a temperature other than normal operating temperature to a support ring constructed of a material having a different temperature coefficient of expansion so that subsequent exposure of the lens plate support ring assembly to normal operating temperature will tension the lens plate on the support ring.

Although the invention has been described only with reference to a preferred embodiment, other embodiments within the scope of the invention will be readily apparent to those skilled in the art. The invention, therefore, is to be limited only by the scope of the appended claims.

What I claim as new and desire to secure by Letters Patent of the United States is:

1. The method of assembling together in precise spaced parallel alignment an electrostatic lens structure comprising three planar metallic members, each of said members having a plurality of spaced openings therein axially alignable with the respective openings in an adjacent member, comprising:
    a. peripherally attaching each of said members to a circular metallic support comprising a material having a non-matching thermal coefficient of expansion, said attachment being made at a preselected temperature so that the respective expansion and contraction of the non-matching materials at the normal operating temperature of the lens structure result in a tensioning of said members,
    b. axially aligning the respective openings in one of said members with the respective openings in adjacent members, and
    c. thereafter securing together the respective adjacent supports on said axially aligned members at points on said supports spaced from said members.

2. The method of claim 1 wherein each of said members comprise molybdenum, each of said supports comprises titanium, and said attachment of the member to the support is made at a low temperature.

3. The method of claim 1 wherein each of said members comprise stainless steel, each of said supports comprises titanium, and said attachment of the member to the support is made at an elevated temperature.

4. The method of assembling together in precise spaced parallel alignment an electrostatic lens structure comprising three planar metallic members, each of said members having a plurality of spaced openings therein axially alignable with the respective openings in an adjacent member, comprising:
    a. removably assembling together three circular metallic supports for said members comprising a material having a non-matching thermal coefficient of expansion with respect to said members;
    b. precisely grinding the surfaces on said supports to which said members will be attached to form precisely parallel planes;
    c. detaching said supports from one another;
    d. peripherally attaching each of said members to one of said circular metallic supports, said attachment being made at a preselected temperature so that the respective expansion and contraction of the non-matching materials at the normal operating temperature of the lens structure result in a tensioning of said members;
    e. axially aligning the respective openings in one of said members with the respective openings in adjacent members; and
    f. thereafter securing together the respective adjacent supports on said axially aligned members at points on said supports spaced from said members.

5. The method of claim 4 wherein each of said members comprise molybdenum, each of said supports comprises titanium, and said attachment of the member to the support is made at a low temperature.

6. The method of claim 4 wherein each of said members comprise stainless steel, each of said supports comprises titanium, and said attachment of the member to the support is made at an elevated temperature.

7. The method of assembling together in precise spaced parallel alignment an electrostatic lens structure comprising three planar metallic members, each of said members having a plurality of spaced openings therein axially alignable with the respective openings in an adjacent member, comprising:

a. peripherally attaching each of said members to a circular metallic support comprising a material having a non-matching thermal coefficient of expansion, said attachment being made at a preselected temperature so that the respective expansion and contraction of the non-matching materials at the normal operating temperature of the lens structure result in a tensioning of said members, one of said supports having at least one insulator thereon and a metallic flange on said insulator insulatively spaced from said one support;

b. axially aligning the respective openings in one of said members with the respective openings in adjacent members; and c. thereafter securing together the respective adjacent supports on said axially aligned members at points on said supports spaced from said members; said support having said insulator thereon being secured to an adjacent support by said flange.

8. The method of claim 7 wherein each of said members comprise molybdenum, each of said supports comprises titanium, and said attachment of the member to the support is made at a low temperature.

9. The method of claim 7 wherein each of said members comprise stainless steel, each of said supports comprises titanium, and said attachment of the member to the support is made at an elevated temperature.

* * * * *

UNITED STATES PATENT OFFICE
CERTIFICATE OF CORRECTION

Patent No. 3,704,511            Dated December 5, 1972

Inventor(s) John M. Hooker

It is certified that error appears in the above-identified patent and that said Letters Patent are hereby corrected as shown below:

In the Claims, column 8, line 20, insert the following claims:

10. The method of Claim 7 wherein said supports and said flange comprise titanium and said insulator comprises a ceramic bondable to said titanium.

11. The method of Claim 7 wherein said adjacent support is mounted to said one support by welding a portion of said adjacent support to said flange.

Signed and sealed this 1st day of May 1973.

(SEAL)
Attest:

EDWARD M. FLETCHER, JR.          ROBERT GOTTSCHALK
Attesting Officer                   Commissioner of Patents